(12) United States Patent
Katz

(10) Patent No.: US 12,465,076 B2
(45) Date of Patent: Nov. 11, 2025

(54) FRESH / CLEAN SMOKING SYSTEM

(71) Applicant: Martin D. Katz, Hammondsport, NY (US)

(72) Inventor: Martin D. Katz, Hammondsport, NY (US)

(*) Notice: Subject to any disclaimer, the term of this patent is extended or adjusted under 35 U.S.C. 154(b) by 432 days.

(21) Appl. No.: 17/982,150

(22) Filed: Nov. 7, 2022

(65) Prior Publication Data

US 2023/0146400 A1 May 11, 2023

Related U.S. Application Data

(60) Provisional application No. 63/280,762, filed on Nov. 18, 2021, provisional application No. 63/276,167, filed on Nov. 5, 2021.

(51) Int. Cl.
 *A24D 1/14* (2006.01)
 *A24F 1/00* (2006.01)
 *A24F 5/00* (2006.01)

(52) U.S. Cl.
 CPC .............. *A24D 1/14* (2013.01); *A24F 1/00* (2013.01); *A24F 5/00* (2013.01)

(58) Field of Classification Search
 None
 See application file for complete search history.

(56) References Cited

U.S. PATENT DOCUMENTS

| | | | |
|---|---|---|---|
| 2,162,077 A | 6/1939 | Gilliam | |
| 3,292,634 A | 12/1966 | Beucler | |
| 3,468,314 A | 9/1969 | Palmer | |
| 3,491,771 A | 1/1970 | Egea et al. | |
| 3,545,449 A | 12/1970 | Pecor | |
| 3,760,814 A | 9/1973 | Fether et al. | |
| 3,792,704 A | 2/1974 | Parker | |
| 3,902,505 A | 9/1975 | Carleton | |
| 4,944,317 A | 7/1990 | Thal | |
| 2006/0207621 A1 | 9/2006 | Shraiber | |
| 2007/0215164 A1* | 9/2007 | Mehio | A24F 1/30 131/173 |
| 2010/0126518 A1 | 5/2010 | Saleh | |
| 2018/0279671 A1* | 10/2018 | Lake | A24F 3/02 |
| 2019/0082732 A1 | 3/2019 | Bautista | |
| 2020/0093174 A1* | 3/2020 | Smedberg | A24F 9/16 |
| 2021/0345666 A1 | 11/2021 | Garrett | |
| 2022/0160025 A1* | 5/2022 | Williamson | A24D 3/08 |

FOREIGN PATENT DOCUMENTS

| | | |
|---|---|---|
| EP | 0241698 B1 | 7/1991 |
| WO | 2013001272 A1 | 1/2013 |
| WO | 2022029756 A1 | 2/2022 |

* cited by examiner

*Primary Examiner* — Philip Y Louie
(74) *Attorney, Agent, or Firm* — Robert M. Schwartz; Alfred K. Dassler

(57) ABSTRACT

An assembly for smoking that includes a bowl that has a circumferential wall with a base wall. The base wall has an aperture formed therein. A filter is disposed on said base wall and covers said aperture. A screen is disposed in said bowl. The screen has an areal surface spaced apart from said filter to define an air gap between said areal surface and said filter.

9 Claims, 7 Drawing Sheets

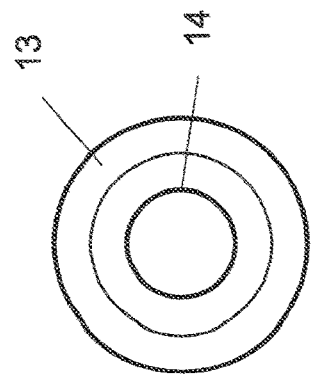
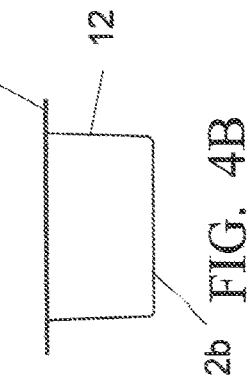
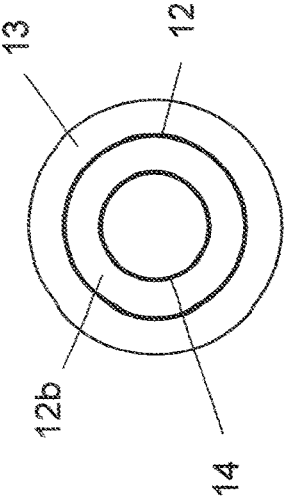
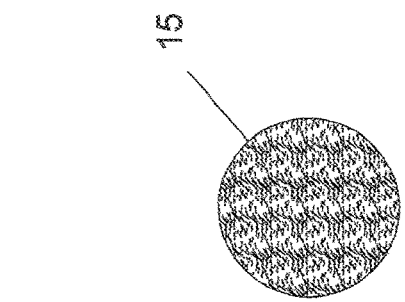
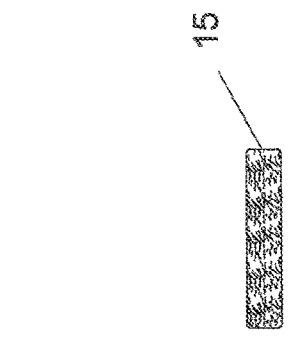
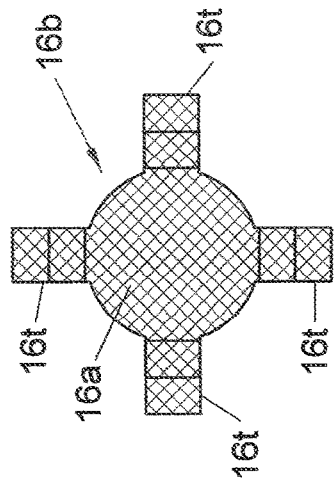
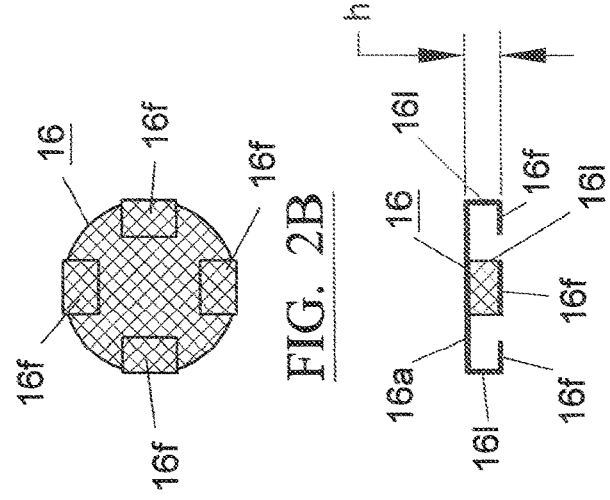

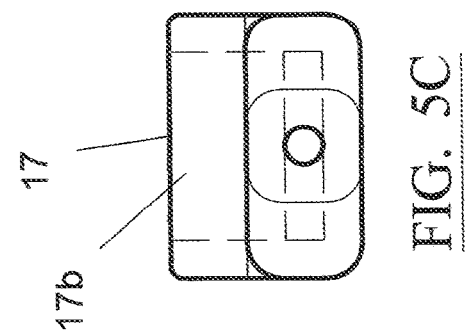
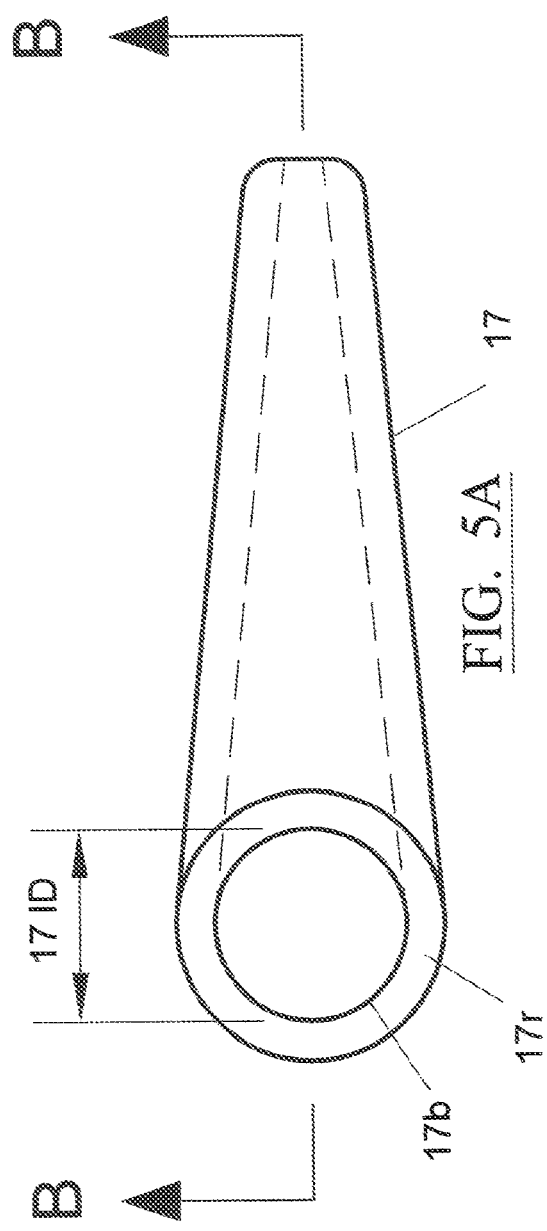
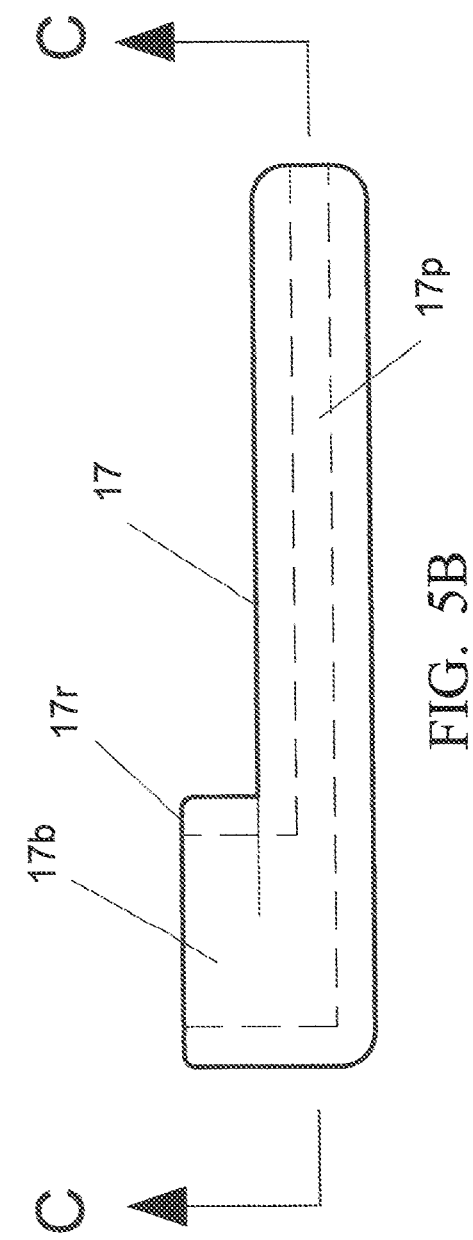

FRESH / CLEAN SMOKING SYSTEM

CROSS REFERENCE TO RELATED APPLICATIONS

This application claims benefit of U.S. Provisional Patent Application No. 63/276,167, filed Nov. 5, 2021, titled Fresh/Clean Smoking System and benefit of U.S. Provisional Patent Application No. 63/280,762, filed Nov. 18, 2021, titled Fresh/Clean Smoking System, the disclosures of which are incorporated herein by reference in their entirety.

BACKGROUND OF THE INVENTION

The device relates to a smoking system used to smoke tobacco or other substances such as marijuana or cannabis that are burned in a pipe bowl, more specifically, the smoking system includes a replaceable bowl that has a filter and a screen and the bowl can be pre-filled with the smoking substance.

a) Field of the Invention

This invention relates to the field of smoking devices for igniting and smoking substances.

As people smoke substances in a bowl, the bowl becomes dirty with by-products of burning the substance such as tar and resins generated by combustion of the substance. This leads to non-desirable and unwanted flavors being present when using a bowl that has had multiple uses and has a build-up of the by-products. While it is possible to clean a bowl, such is a time consuming and messy process. Moreover, a completely clean or fresh bowl is very difficult if not impossible to achieve for a bowl that has been used.

a) b) Description of the Related Art

It is well known to provide bowl assemblies for smoking substances that have a screen, filter medium, and an area for the substance to be smoked. U.S. Pat. No. 2,162,077 discloses a tobacco cartridge that has a removable bowl cup that has a threads that mate with threads on a stem portion of a pipe. The cup includes a charge of tobacco surrounded by paper and an air space surrounds the charge of tobacco. The charge of tobacco rests upon a filter of non-burning material. The filter is held by a body portion with perforations where the body portion is downstream of the filter in a direction of flow of the pipe. The fact that the filter is disposed directly downstream of the charge requires that the filter be of a non-burning material results in possible unhealthy materials being inhaled into a user's lungs in addition to the substance of the charge being smoked.

Egea et al. U.S. Pat. No. 3,491,771 discloses a pipe tobacco packet. Egea has an inner bowl of aluminum foil that is disposed inside an outer bowl. The inner bowl has a bottom wall that is a screen and the inner bowl can hold tobacco therein. An outer bowl surrounds the inner bowl and has a solid bottom wall. A filter is disposed between the outer and inner bowl at the bottom and extends up the walls of the bowls. The upper area of the outer bowl in an area free of the filter has apertures that open to an air space between the pipe bowl and the outer bowl. This construction results in the filter being directly next to the tobacco and the filter being directly adjacent the lit tobacco.

SUMMARY OF THE INVENTION

It is accordingly an object of the invention to provide a smoking system which overcomes the above-mentioned disadvantages of the heretofore-known devices and methods of this general type and which can be implemented to provide a clean smoking experience.

With the foregoing and other objects in view there is provided an assembly for smoking that includes a bowl that has a circumferential wall with a base wall. The base wall has an aperture formed therein. A filter is disposed on the base wall and covers the aperture. A screen is disposed in the bowl. The screen has an areal surface spaced apart from the filter to define an air gap between the areal surface and the filter.

It is accordingly a further feature of the invention, that the areal surface has legs extending therefrom. The legs has feet to rest against the filter and set the air gap.

In accordance with an added feature of the invention, a smoking material is disposed in the bowl on the screen.

In accordance with an additional feature of the invention the seal seals the entire bowl.

In accordance with yet an additional feature of the invention, the circumferential wall has a draft angle.

In accordance with yet another added feature of the invention, the circumferential wall applies a radially inward pressure against the legs to secure the screen in the bowl.

In accordance with still another added feature of the invention, there is a pipe portion with a pipe bowl. The bowl is disposed in the pipe bowl.

Although the invention is illustrated and described herein as fresh/clean smoking system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2A is a plan view of a screen blank;
FIG. 2B is a bottom view of the screen after tabs have been bent;
FIG. 2C is a side view of the screen after tabs have been bent;
FIG. 3A is a bottom view of a filter;
FIG. 3B is a side view of the filter;
FIG. 4A is a top view of an inner bowl;
FIG. 4B is a side view of the inner bowl;
FIG. 4C is a bottom view of the inner bowl;
FIG. 5A is a top view of a pipe portion;
FIG. 5B is a side view of the pipe portion;
FIG. 5C is an end view of the pipe portion.

DETAILED DESCRIPTION OF PREFERRED EMBODIMENTS

Figure 1A:
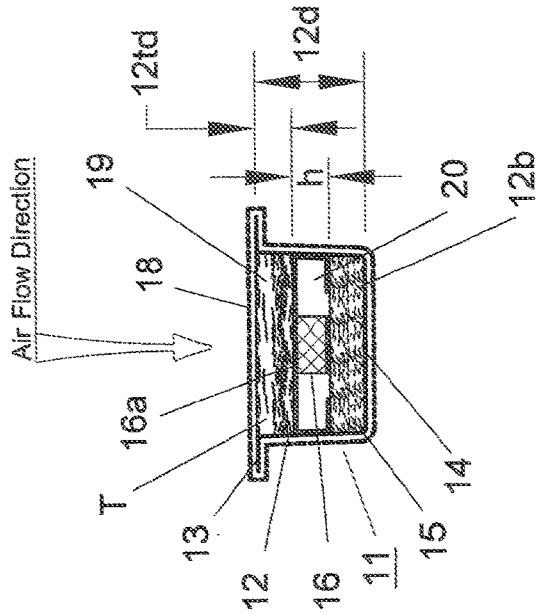
FIG. 1A is a perspective view of an inner bowl assembly.
Figure 1B:
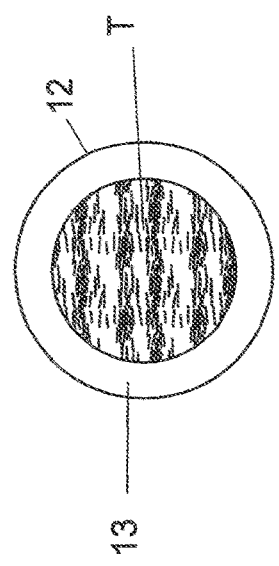
FIG. 1B is a top view of the inner bowl assembly.
Figure 1C:
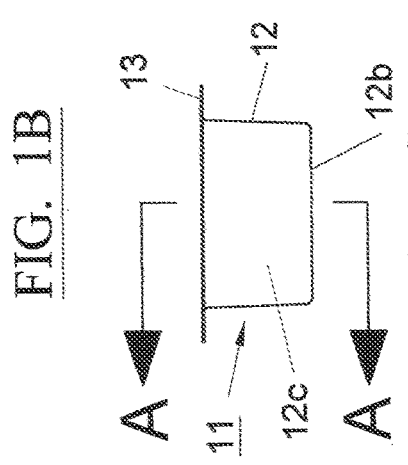
FIG. 1C is a side view of the inner bowl assembly.
Figure 1D:
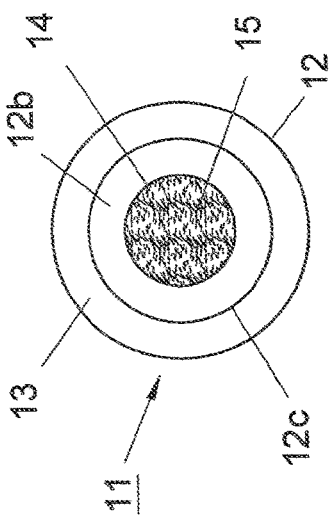
FIG. 1D is a bottom view of the inner bowl assembly.
Figure 1E:
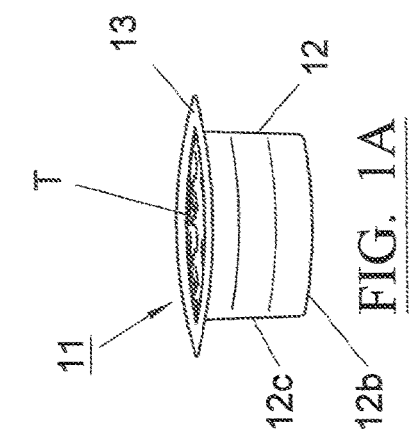
FIG. 1E is a section view of the inner bowl assembly taken at section A-A in FIG. 1C.
Figure 5E:
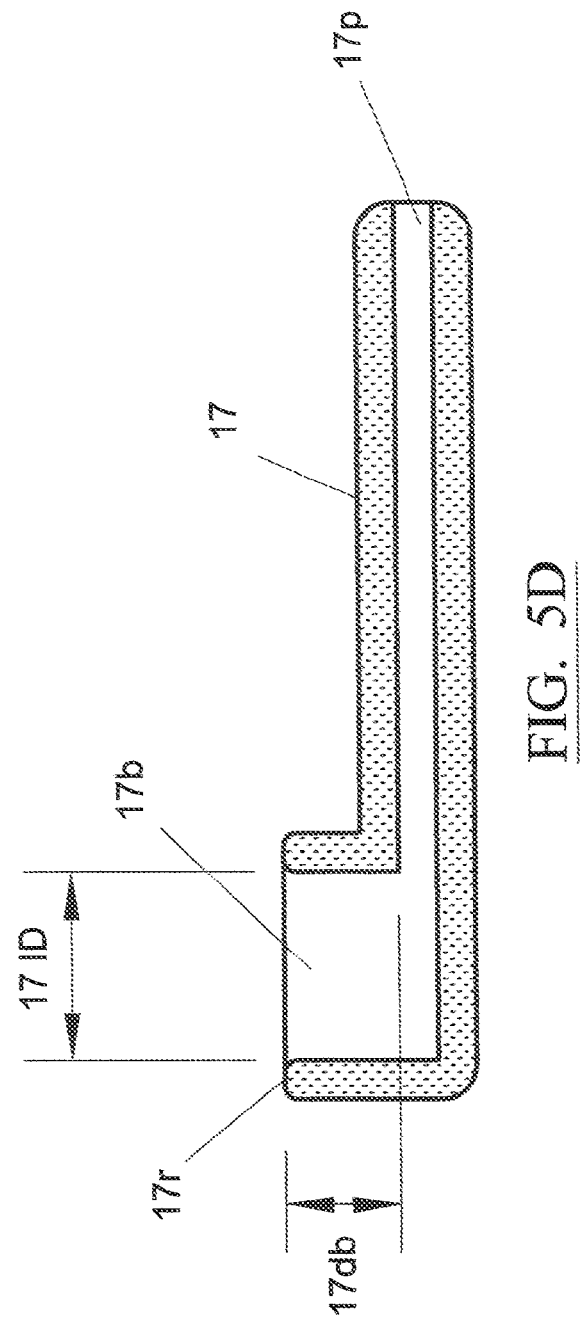
FIG. 5E is a section view of the pipe portion taken at section C-C in FIG. 5B.
Figure 5D:
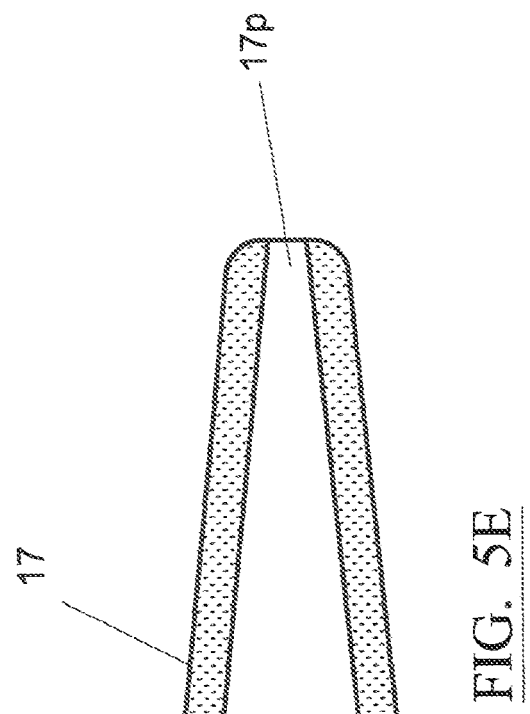
FIG. 5D is a section view of the pipe portion taken at section B-B in FIG. 5A.

As shown in FIGS. 1A-1E The system 1 includes an inner bowl assembly 11 that can be pre-filled with the desired smoking substance T. The inner bowl assembly 11 includes a bowl 12, a screen 16, a filter 15 and may include the smoking substance T. The inner bowl assembly 11 can be completed wrapped and sealed in a freshness seal 18, which may be a shrink-wrap type seal. This ensures the freshness of the smoking substance T when such is provided in the assembly 11. It is possible for the inner bowl assembly 11 to be provided without the smoking substance T so that a user can fill and smoke as desired. This provides a user an option for a clean bowl that the user can use with a desired smoking substance and replace at their own discretion. In such instance, the seal 18 is also omitted as there is no product to maintain freshness of.

The system 1 can include a pipe or pipe portion 17 with a pipe bowl 17*b* that has a rim 17*r*. The inner bowl 12 is disposed in the pipe bowl 17*b*. Furthermore, the pipe bowl 17*b* can have a substantially straight inner wall in a depth direction thereof and the wall defines a pipe bowl inside diameter 17ID.

The filter 15 is disposed at the base 12*b* of the bowl 12 and covers the aperture 14. The filter material may be made of carbon material and possibly biodegradable. As will be seen from the following description the screen 16 is disposed in the bowl 12 with an areal surface 16*a* spaced apart from the filter 15 so that an air space 20 is provided between the smoking substance and the filter 15. Thus, the air space 20 is upstream of the filter 15 in an air/smoke flow direction of the bowl 12.

To this end the screen 16 may be formed from a blank 16*b* of stainless steel, brass, copper or other suitable metal and as is shown in FIG. 2A. The blank 16*b* may have tabs 16*t* extending from a circumferential edge of the areal surface 16*a* of the blank 16*b*. FIGS. 2B and 2C show that the tabs 16*t* have been bent at the circumferential edge of the blank 16*b* to be substantially orthogonal to main screen surface of the screen 16 and define legs 16*l*. A distal end portion of the tab 16*t* can be bent inwards so as to be substantially parallel to the areal surface 16*a* of the screen 16 and respectively define respective feet 16*f* that rest on the filter 15 when the screen 16 is disposed in the inner bowl. The legs 16*l* with the feet consequently define a height h of the air space 20 between the areal surface 16*a* and the filter 15. The filter 15 and the screen construction set an effective depth 12*td* of a loading volume 19 for the smoking substance T. The effective depth is preferably about one third of the depth 12*d* of the inner bowl 12. This relationship ensures that the smoking substance T is expended before the lower amount (last to burn) of the smoking substance T accumulates resins and tar of the already burned substance T, which can adversely affect the flavor/taste of the smoking substance T.

The bowl 12 has a circumferential wall portion 12*c* with a flange 13. The flange 13 has an underside at an upper edge of the bowl 12. The bowl 12 has a base 12*b* at a bottom of the cup portion 12*c* with an aperture 14 formed therein. The circumferential wall 12*c* may have a taper with a draft or taper angle α. The importance of this construction is discussed below.

The taper or the circumferential wall 12*c* may have a dimensional relationship to the formed screen 16 so that the wall 12*c* provides a radially inward force onto the legs 16*l*, which helps to hold the screen 16 in place with the feet 16*f* rested against the filter 15.

Figure 8:
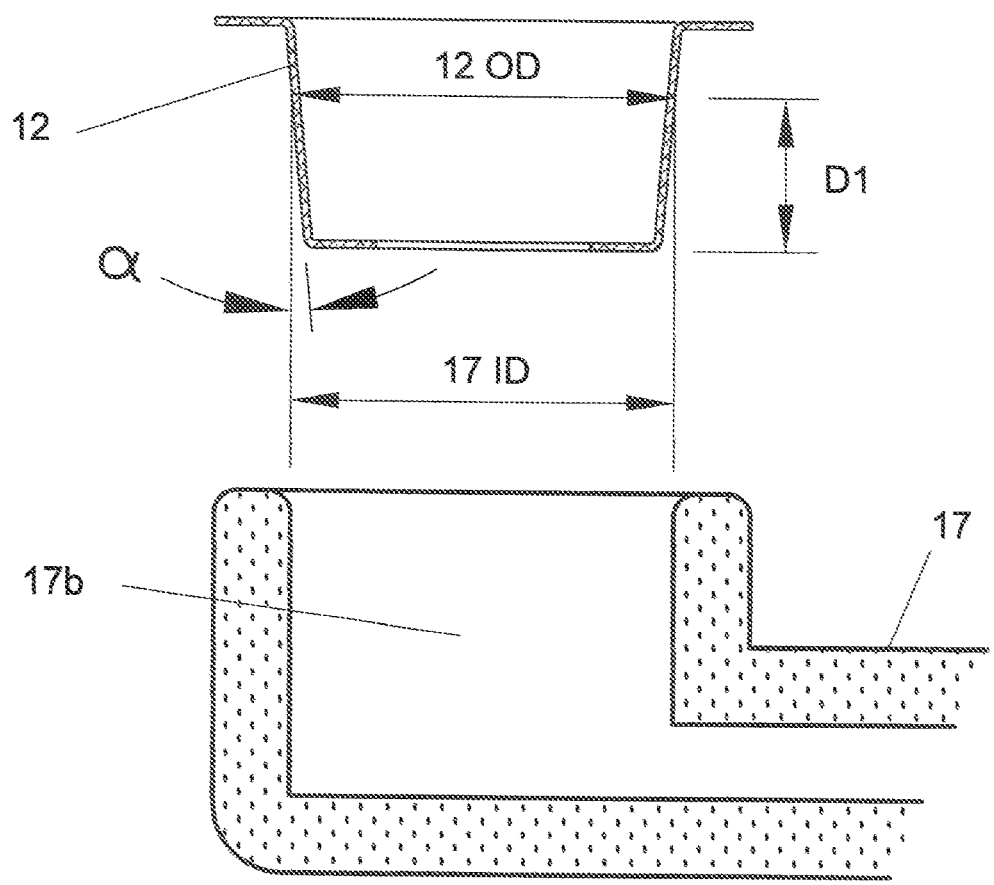
FIG. 8 is a view of the inner bowl and the pipe portion.

Additionally, the circumferential wall 12*c* may be sized to cooperate with the pipe bowl inside diameter 17ID. Particularly, it is possible that the circumferential wall has an outer diameter 12OD at position shown in FIG. 8 which is substantially the same as the inner diameter 17ID. The position is at a distance D1 from the base of the inner bowl 12 and is at a position nominally above the areal screen surface 16*a* with the screen feet 16*f* positioned against the filter 15. The position of the matched diameters provides for a slight compression above the screen 16 to further hold the screen 16 in place once the inner bowl 12 is inserted into the pipe bowl 17*b*. The construction also further ensures a good sealing between the inner bowl 12 and the pipe bowl 17*b*.

When inserted for use into a pipe portion 17, the aperture 14 is fluidically connected to a passage 17*p* of the pipe portion 17 and an underside of the flange 13 rests upon the rim 17*r* when the inner bowl assembly 11 is inserted into the pipe bowl 17*b*. The flange 13 rests against the rim 17*r* to indicate that the inner bowl 12 is properly inserted into the pipe bowl 17*b* and can further ensure a good seal between the pipe bowl 17*b* and the inner bowl 12.

The construction results in the air flow to the passage 17*p* occurring through the smoking substance T and the aperture 14 in the base of the inner bowl 12. The bowl 12 may be formed from a thin sheet of metal that is approximately 25 millimeters in diameter and approximately 15 millimeters deep.

Alternatively, the screen 16 could be cup-shaped with a flange that rests upon the flange 13 of the bowl 12, where the depth of the cup is less that the distance between a top of the filter 15 and the flange 13 in order to set the height h of the air space 20 and provide the loading volume 19 as disclosed herein.

As seen in FIG. 3A, the filter 15 is cylindrical and has planar end faces to seat in the base 12*b* of the bowl 12. The surface area thereof is greater than the size of the aperture 14 so that the combusted smoke to be inhaled passes through the filter medium of the filter 15.

FIGS. 4A-4C show the inner bowl 12 in the top and bottom views, the flange 13, aperture 14, and circumferential wall are shown. The side view shows the cup and flange diameters.

FIGS. 5A-6C show the pipe portion 17 with the pipe bowl 17*b*. The pipe bowl 17*b* is sized to receive inner bowl 12 and thus is sized with appropriate dimensions as disclosed to properly receive the inner bowl 12 and have the flange 13 rest against the rim 17*r* of the pipe bowl 17*b*. The pipe bowl 17*b* has a depth 17*bd* to the passage 17*p* that allows the passage to have the fluidic connection to the aperture 14 of the inner pipe bowl 12. In other words, the depth 17*bd* is such that the passage opens into the bowl with at least a portion of the passage 17*p* below the inner bowl base wall 12*b* when installed in the pipe bowl 17*b*.

Figure 6A:
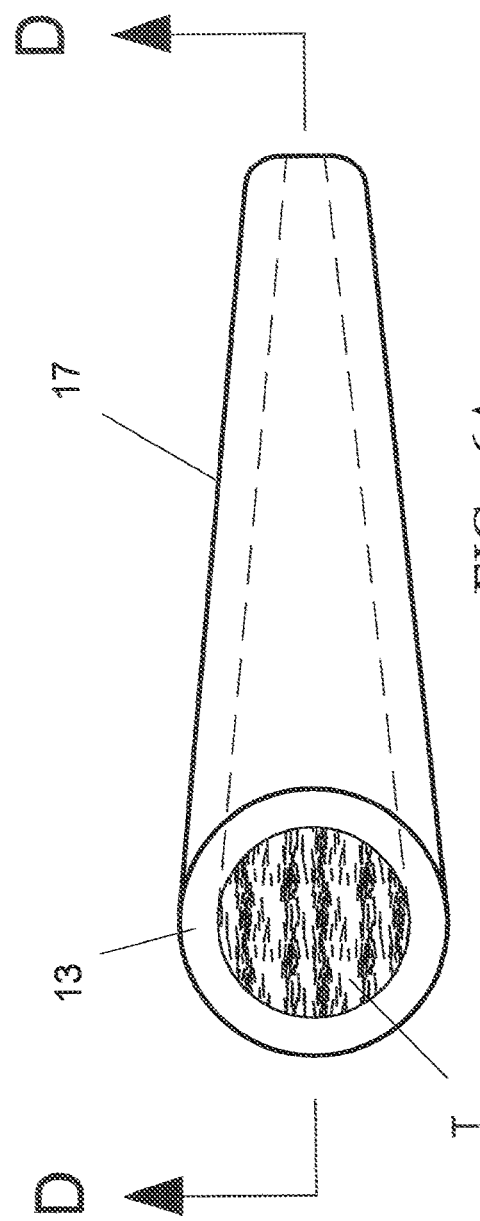
FIG. 6A is a top view of a pipe portion with the inner bowl assembly inserted in the pipe portion.
Figure 6B:
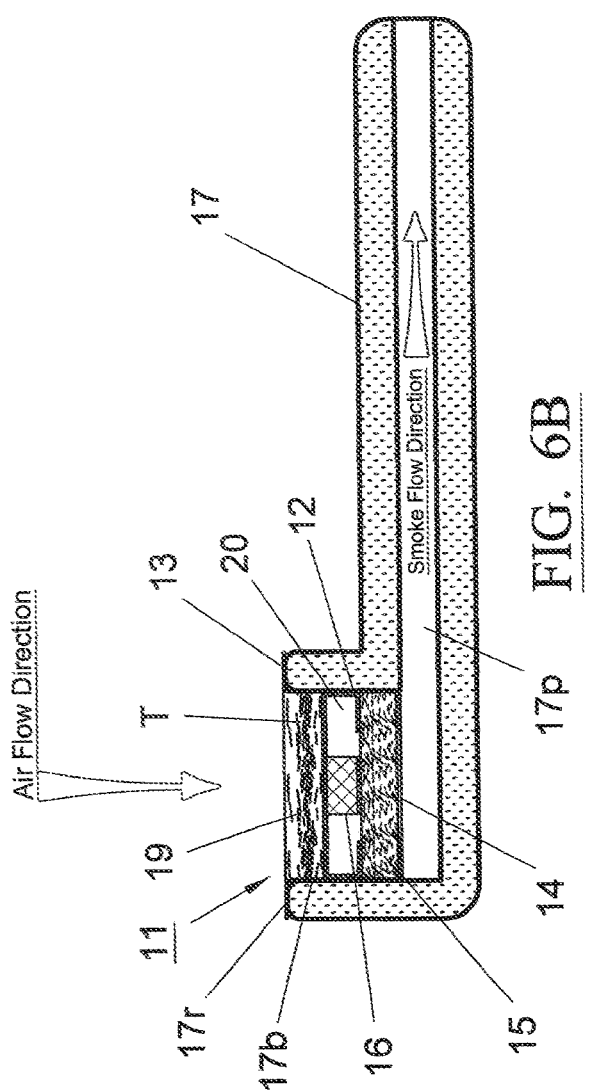
FIG. 6B is a section view taken at section D-D in FIG. 6A.
Figure 7:
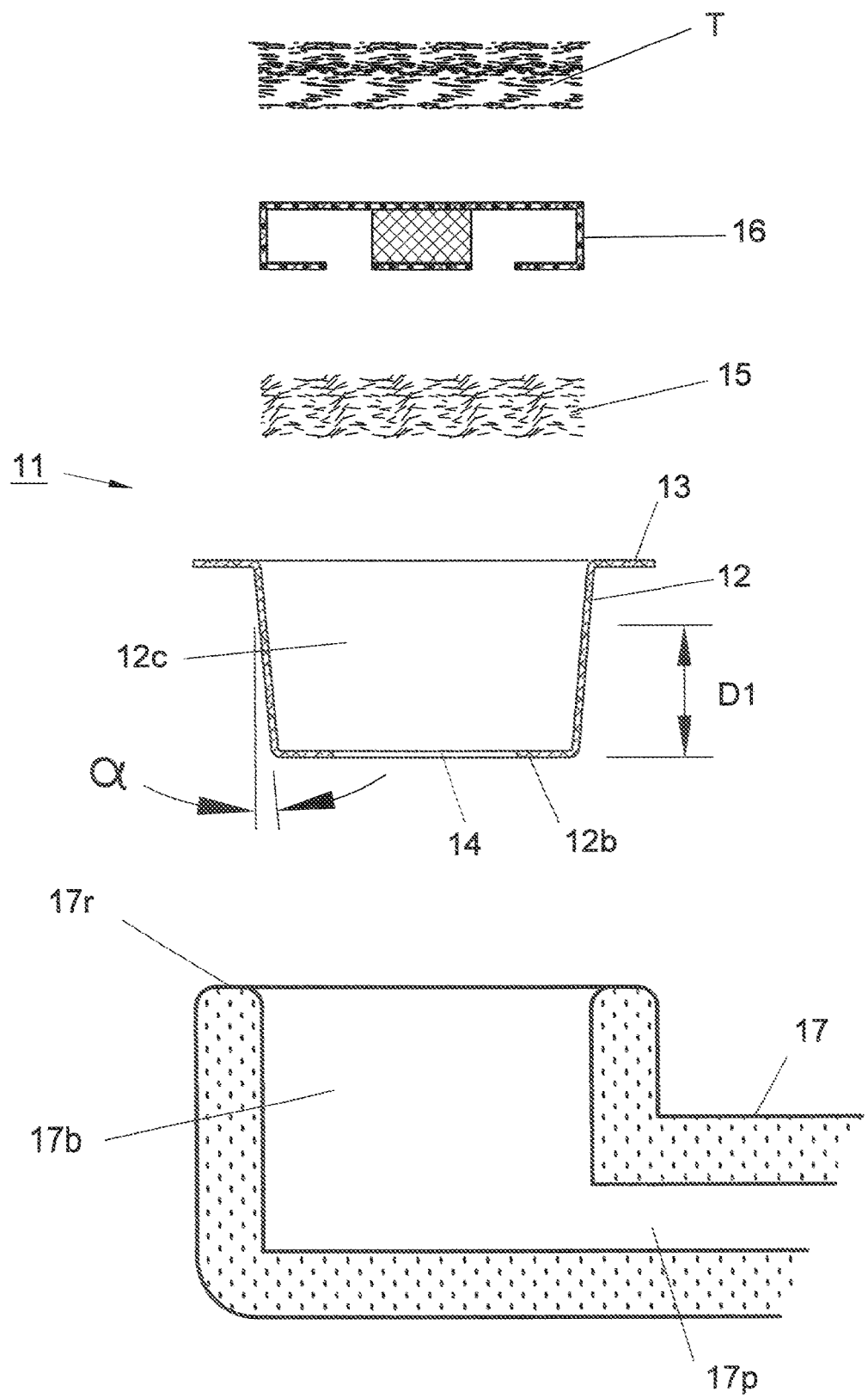
FIG. 7 is an exploded view of the inner bowl assembly and the pipe portion.

FIGS. 6A and 6B show the system 1 with the inner bowl assembly 11 disposed in the pipe bowl 17*b*. The freshness seal 18 has been removed and the flange 13 rests against the rim 17*r*. The aperture 14 is in fluidic communication with the pipe passage 17*p* and the smoking substance T can be lit and burned when the user desires to smoke the smoking substance T.

I claim:

1. An assembly for smoking comprising:
   a bowl having a circumferential wall with a base wall, said base wall having an aperture formed therein;
   a filter disposed on said base wall and covering said aperture; and
   a screen disposed in said bowl, said screen having an areal surface spaced apart from said filter for defining an air gap between said areal surface and said filter, said areal surface having legs extending therefrom, said legs have feet to rest against said filter and setting said air gap, said areal surface having a circumferential edge with tabs extending therefrom, each of said tabs being bent to define respective ones of said legs and said feet.

2. The assembly according to claim 1, further comprising a smoking material disposed in said bowl on said screen.

3. The assembly according to claim 2, further comprising a seal sealing said entire bowl.

4. The assembly according to claim 1, wherein said circumferential wall has a draft angle.

5. The assembly according to claim 4, wherein said circumferential wall applies a radially inward pressure against said legs to secure said screen in said bowl.

6. The assembly according to claim 1, further comprising a pipe portion with a pipe bowl, said bowl being disposed in said pipe bowl.

7. The assembly according to claim 1, wherein said circumferential wall defines an open end opposite said base wall, said screen, said air gap, and said filter are disposed in sequence from said open end to said base wall.

8. The assembly according to claim 1, further comprising a smoking material disposed in said bowl on said screen and a shrink wrap seal completely wrapping and sealing said entire bowl.

9. An assembly for smoking comprising:
   a bowl having a circumferential wall with a base wall, said base wall having an aperture formed therein;
   a filter disposed on said base wall and covering said aperture; and
   a screen disposed in said bowl, said screen having an areal surface with legs extending therefrom for spacing said areal surface apart from said filter for defining an air gap between said areal surface and said filter, said legs being supported by said filter and positioning said areal surface for defining an effective depth of a loading volume of the bowl.

* * * * *